(12) United States Patent
Khambanonda et al.

(10) Patent No.: US 9,489,757 B2
(45) Date of Patent: Nov. 8, 2016

(54) RESIZABLE TEXT BACKING SHAPES FOR DIGITAL IMAGES

(71) Applicant: Microsoft Corporation, Redmond, WA (US)

(72) Inventors: Panuruj Khambanonda, Bellevue, WA (US); Vladimir Cabildo, Bellevue, WA (US); Carolina Hernández, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 14/055,855

(22) Filed: Oct. 16, 2013

(65) Prior Publication Data

US 2015/0103079 A1   Apr. 16, 2015

(51) Int. Cl.
*G09G 5/00* (2006.01)
*G06T 11/60* (2006.01)

(52) U.S. Cl.
CPC ..................... *G06T 11/60* (2013.01)

(58) Field of Classification Search
USPC .......................................................... 345/636
See application file for complete search history.

(56) References Cited

U.S. PATENT DOCUMENTS

| | | | | |
|---|---|---|---|---|
| 5,493,639 | A * | 2/1996 | Hirano | G06T 11/60 345/441 |
| 6,445,396 | B1 * | 9/2002 | Suzuki | G06T 11/60 345/468 |
| 7,526,139 | B2 * | 4/2009 | Yamakado | G06T 11/60 345/636 |
| 7,733,405 | B2 | 6/2010 | Van Dyke et al. | |
| 7,792,876 | B2 | 9/2010 | Easwar | |
| 7,990,564 | B2 | 8/2011 | Hanechak | |
| 8,059,138 | B2 * | 11/2011 | Fujii | G06T 11/60 345/629 |
| 8,091,018 | B2 * | 1/2012 | Gilinsky | G06F 9/4443 345/619 |
| 8,234,564 | B2 | 7/2012 | Drieu et al. | |
| 8,872,969 | B1 | 10/2014 | Rathi et al. | |
| 2002/0171671 | A1 * | 11/2002 | Bou | G06T 11/60 345/629 |
| 2005/0012760 | A1 * | 1/2005 | Yamamoto | G06T 11/60 345/636 |
| 2006/0058949 | A1 * | 3/2006 | Fogel | G01C 21/3673 345/629 |
| 2006/0139371 | A1 | 6/2006 | Lavine et al. | |
| 2007/0009179 | A1 | 1/2007 | Easwar | |
| 2008/0095470 | A1 | 4/2008 | Chao et al. | |
| 2011/0074824 | A1 | 3/2011 | Srinivasan et al. | |
| 2013/0069980 | A1 | 3/2013 | Hartshorne et al. | |
| 2013/0167001 | A1 | 6/2013 | De Angelis et al. | |
| 2014/0015826 | A1 * | 1/2014 | Licata | G06T 15/04 345/419 |
| 2014/0075371 | A1 * | 3/2014 | Carmi | G06F 11/3438 715/781 |

(Continued)

OTHER PUBLICATIONS

"Configuring the Viewport", Retrieved at: <<https://developer.apple.com/library/ios/documentation/AppleApplications/Reference/SafariWebContent/UsingtheViewport/UsingtheViewport.html>>, Sep. 19, 2012, 14 pages.

(Continued)

*Primary Examiner* — Ryan R Yang
(74) *Attorney, Agent, or Firm* — Daniel Choi; Micky Minhas

(57) ABSTRACT

In one embodiment, a digital image viewer 110 may use an adjustable text backing shape 312 to preserve legibility of an image text segment 310 during size conversions of a digital image 304. The digital image viewer 110 may determine a viewport size of a viewport 302 for a display application 112 that downloads a digital image 304 with an image text segment 310. The digital image viewer 110 may interleave an adjustable text backing shape 312 of an independently adjustable shape size based on the viewport size between the digital image 304 and the image text segment 310.

20 Claims, 13 Drawing Sheets

(56) References Cited

U.S. PATENT DOCUMENTS

2014/0270533 A1 9/2014 Chedeau
2015/0103092 A1 4/2015 Khambanonda et al.

OTHER PUBLICATIONS

Knight, Kayla, "Responsive Web Design: What It Is and How to Use It", Retrieved at: <<http://krackerjackdesigns.com/SM-ResponsiveWebDesign.pdf>>, Jan. 12, 2011, 36 pages.

Gillenwater, Zoe Mickley, "Modern CSS Layouts, Part 2: The Essential Techniques", Retrieved at: <<http://coding.smashingmagazine.com/2010/05/06/modern-css-layouts-part-2-the-essential-techniques/>>, May 6, 2010, 36 pages.

Sorotokin, et al., "EPUB Adaptive Layout", Retrieved at: <<http://epub-revision.googlecode.com/svn/trunk/src/proposals/css_page_templates/csspgt-doc.xhtml>>, Sep. 5, 2013, 23 pages.

Silva, et al., "Support for Arbitrary Regions in XSL-FO", In Proceedings of the ACM Symposium on Document Engineering, Nov. 2, 2005, 10 pages.

Gabbard, et al., "Active Text Drawing Styles for Outdoor Augmented Reality: A User-Based Study and Design Implications", In Proceedings of IEEE Virtual Reality, Mar. 10, 2007, 8 pages.

Choquer, Champagne, "Device Independence: Responsive Design Strategies for Digital Publications", A Project Report Submitted in Partial Fulfillment of the Requirements for the Degree of Master of Publishing, Aug. 27, 2012, 64 pages.

Office Action Issued In U.S. Application No. 20150103092 A1, Mailed Date: Jul. 17, 2015, 20 Pages.

Final Office Action Issued In U.S. Application No. 20150103092 A1, Mailed Date: Feb. 23, 2016, 23 Pages.

\* cited by examiner

100

*400*

*450*

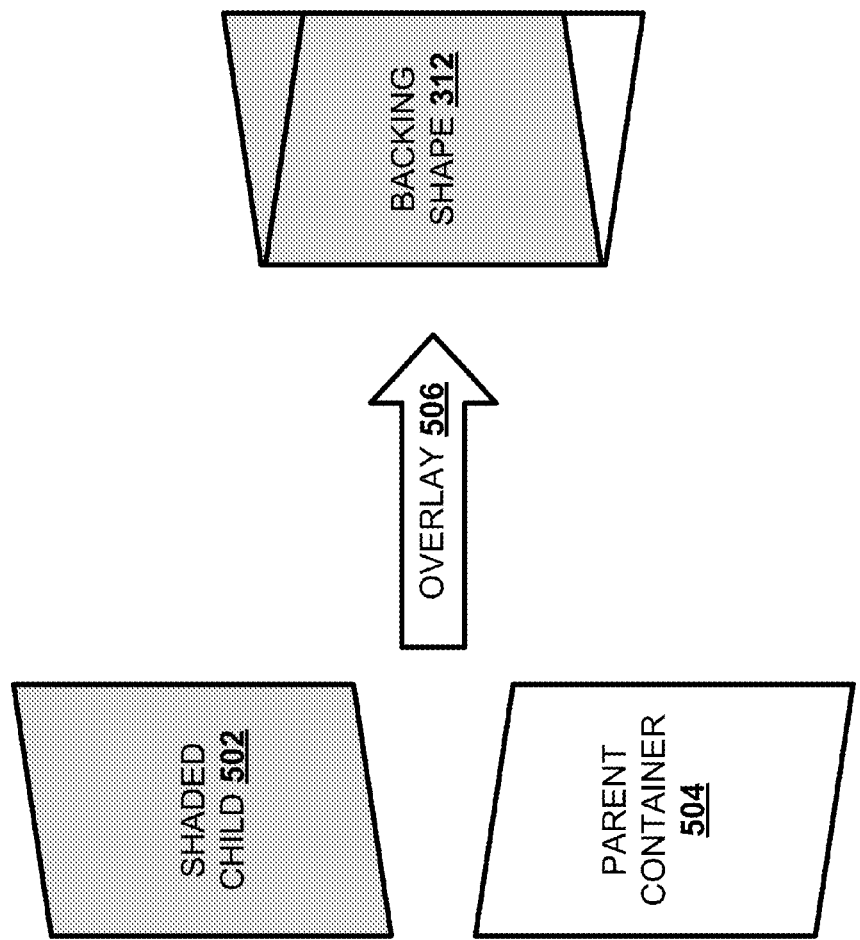

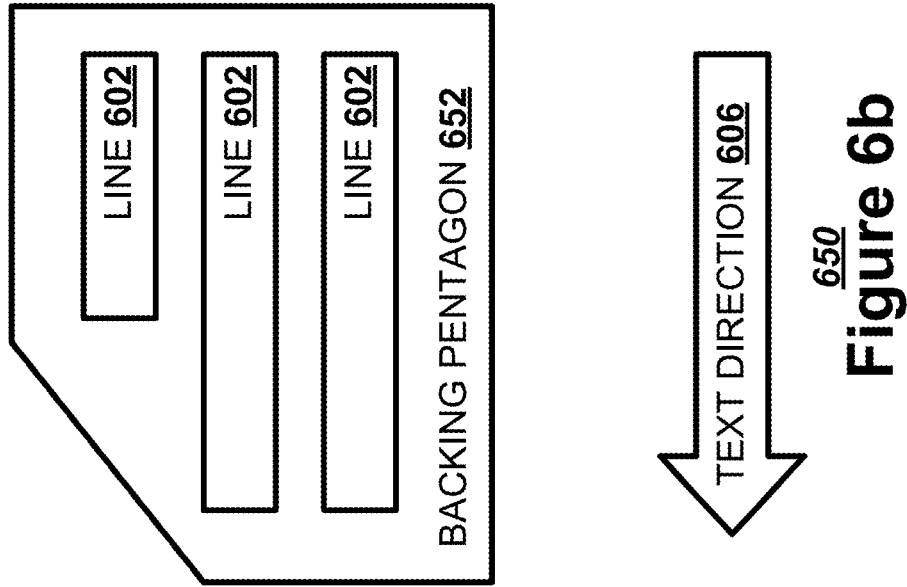
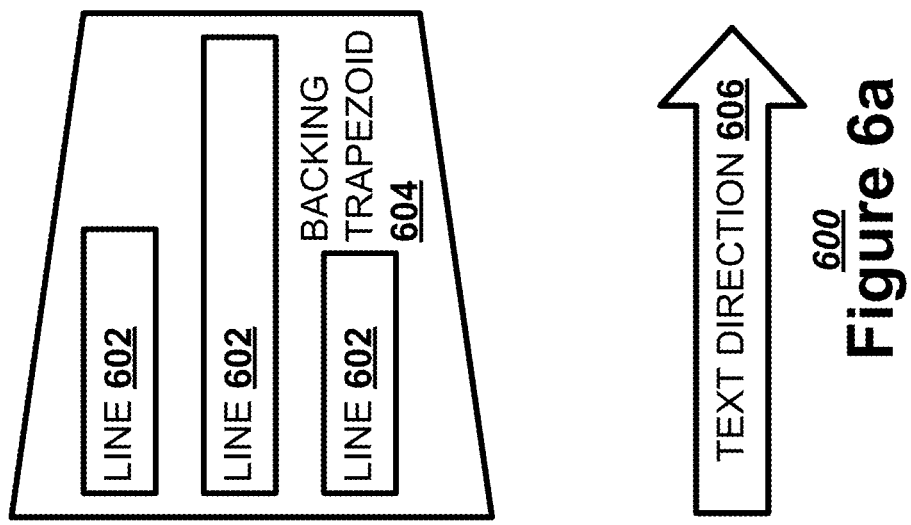

700

800

RESIZABLE TEXT BACKING SHAPES FOR DIGITAL IMAGES

BACKGROUND

A digital image viewer may execute a display application that downloads a digital image from an image server. A display application may be a browser, document viewer, or other application that displays a digital image to a user. The display application may fit within a viewport on a display screen. A viewport refers to the area of a display screen presenting the digital image. The viewport may be set by the size of the display screen or the size of an application frame within the display screen. The display application may select from one of a number of different-sized versions of the digital image provided by the image server to properly fit within the viewport.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using an adjustable text backing shape to preserve legibility of an image text segment during size conversions of a digital image. The digital image viewer may determine a viewport size of a viewport for a display application that downloads a digital image with an image text segment. The digital image viewer may interleave an adjustable text backing shape of an independently adjustable shape size based on the viewport size between the digital image and the image text segment.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 4A:
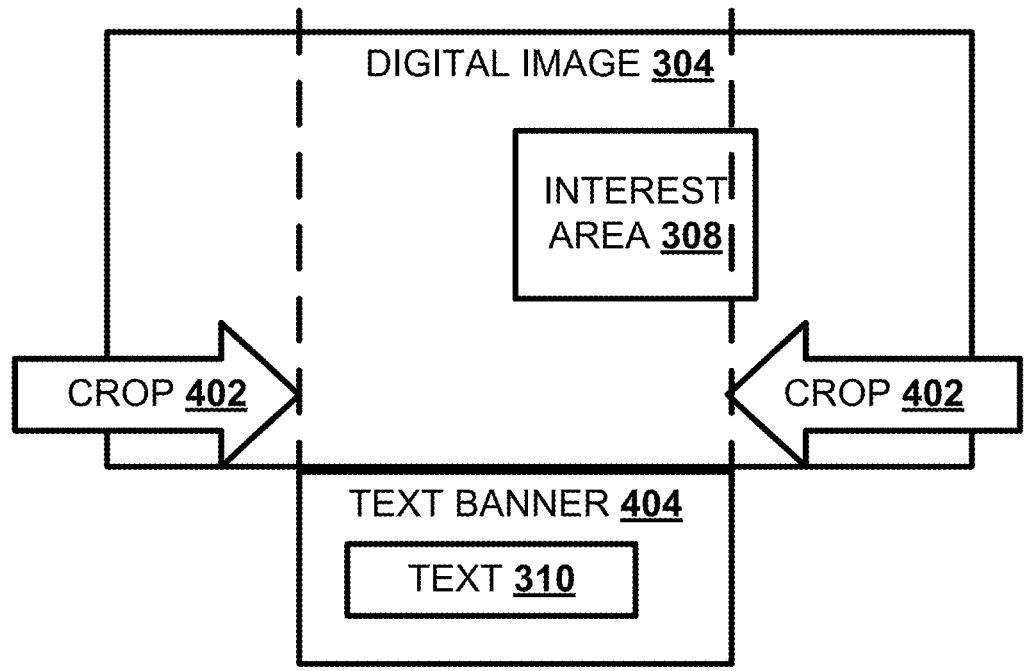
Figure 4B:
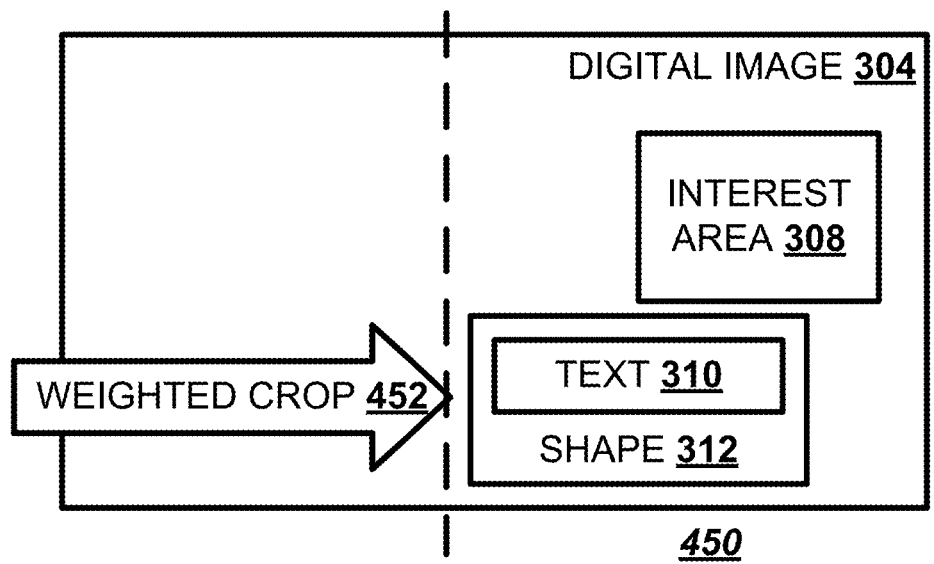

FIGS. 4*a-b* illustrate, in block diagrams, various embodiments of automatic size adjustments.

FIG. 5 illustrates, in a block diagram, one embodiment of a backing shape construction.

FIGS. 6*a-b* illustrate, in block diagrams, various embodiments of backing shape configurations.

Figure 7:
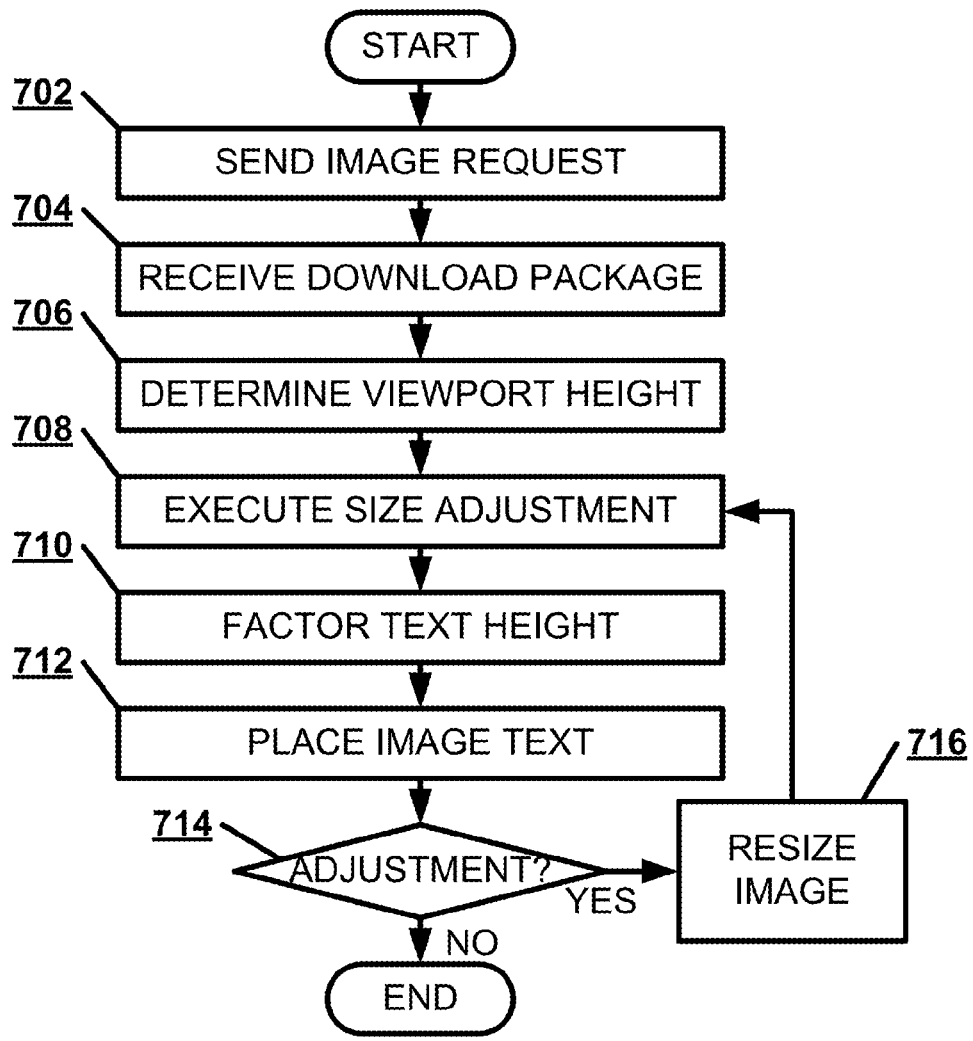

FIG. 7 illustrates, in a flowchart, one embodiment of a method of displaying an adjustable digital image in a digital image viewer.

Figure 8:
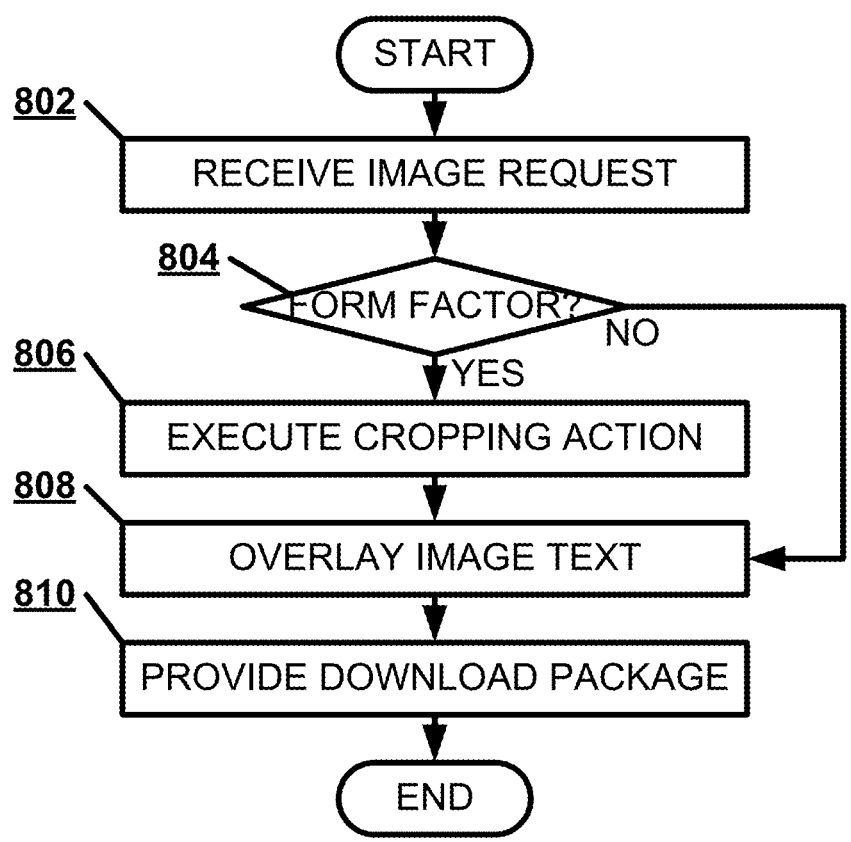

FIG. 8 illustrates, in a flowchart, one embodiment of a method of providing an adjustable digital image to a digital image viewer.

Figure 9:
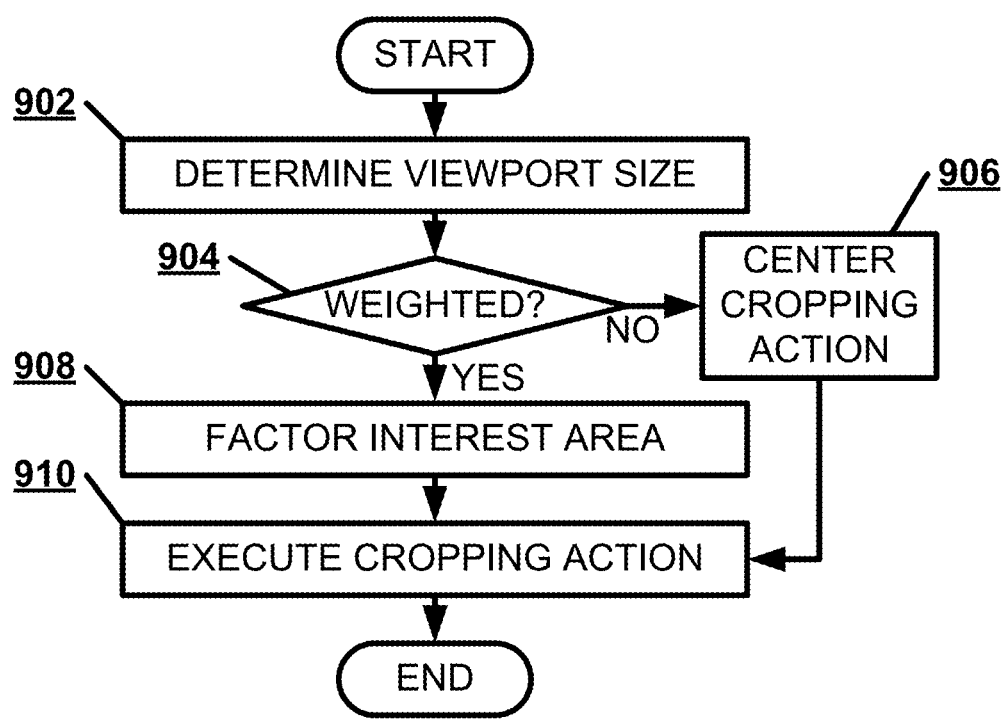

FIG. 9 illustrates, in a flowchart, one embodiment of a method of automatic size adjustment.

Figure 10:
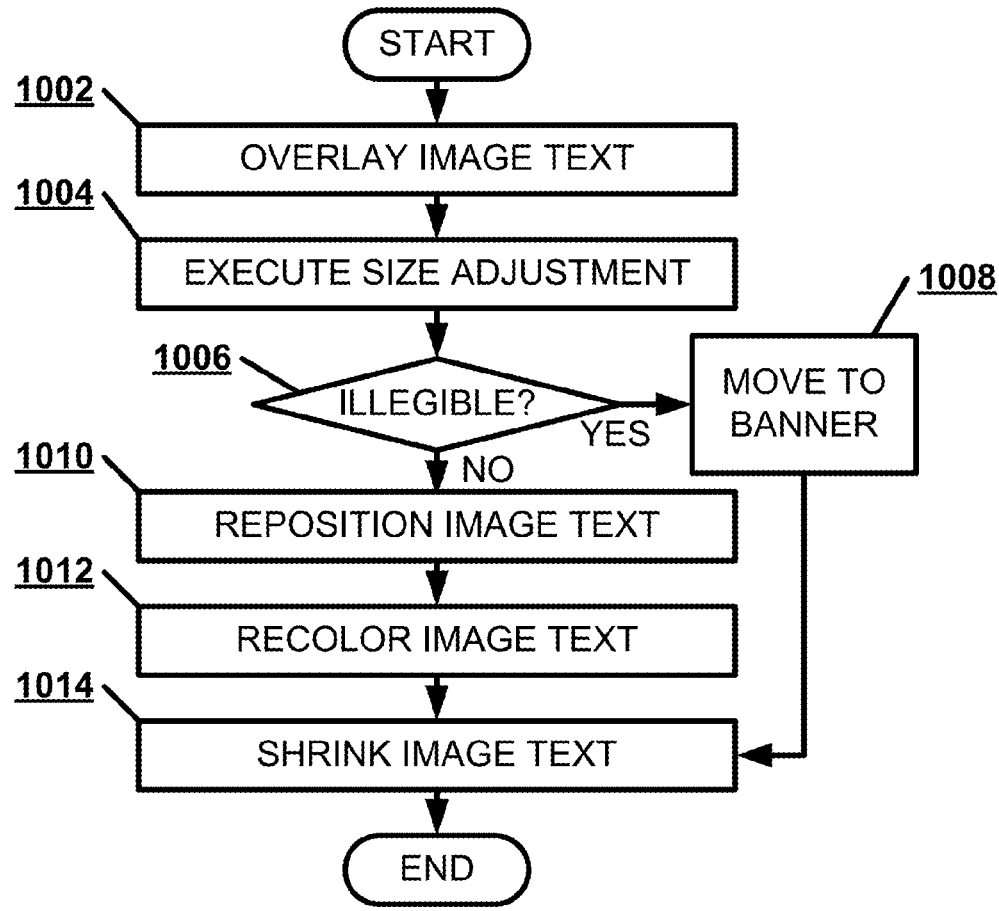

FIG. 10 illustrates, in a flowchart, one embodiment of a method of placing an image text segment on a digital image.

Figure 11:
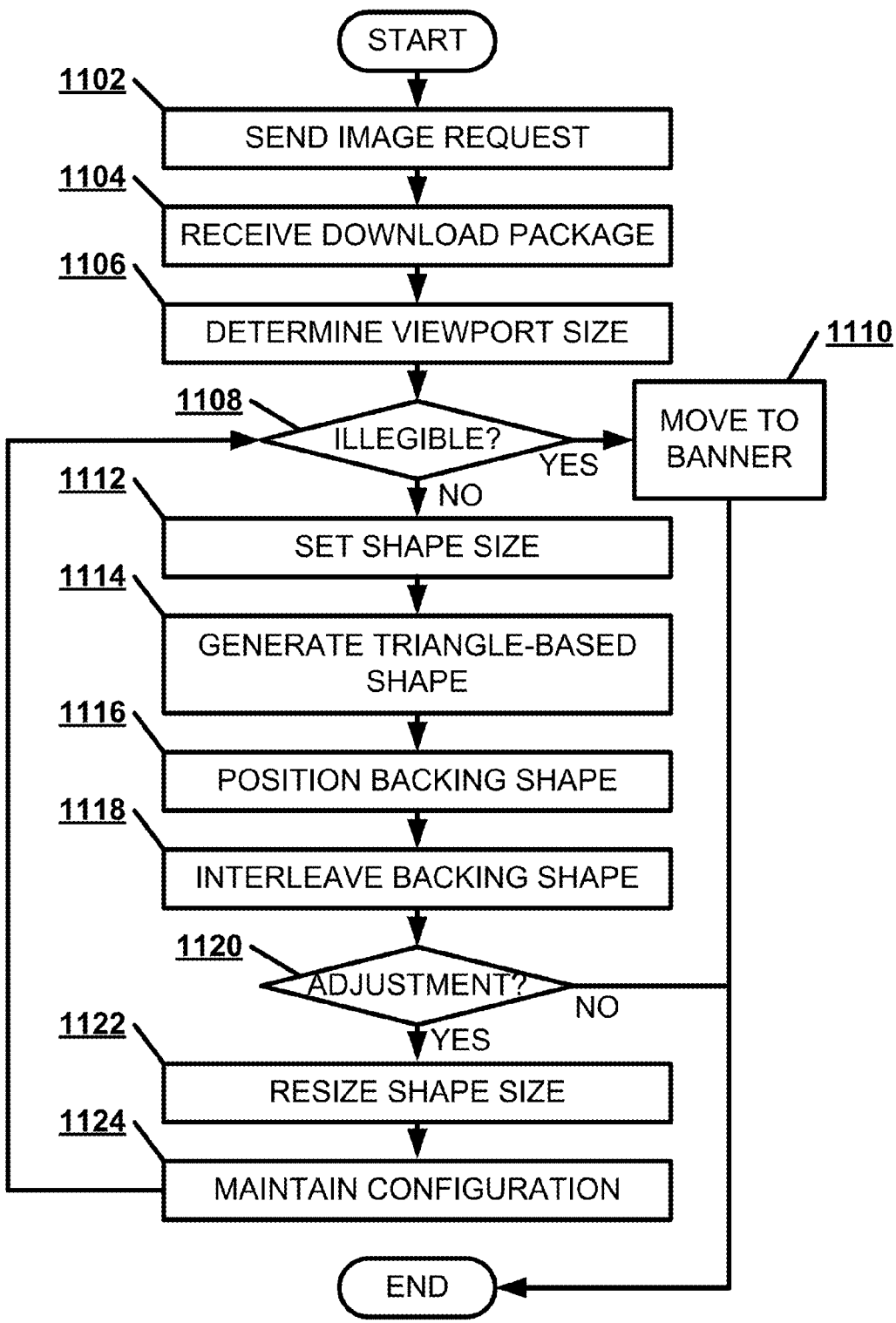

FIG. 11 illustrates, in a flowchart, one embodiment of a method of displaying an adjustable digital image with an image text segment and an adjustable text backing shape on a digital image viewer.

Figure 12:
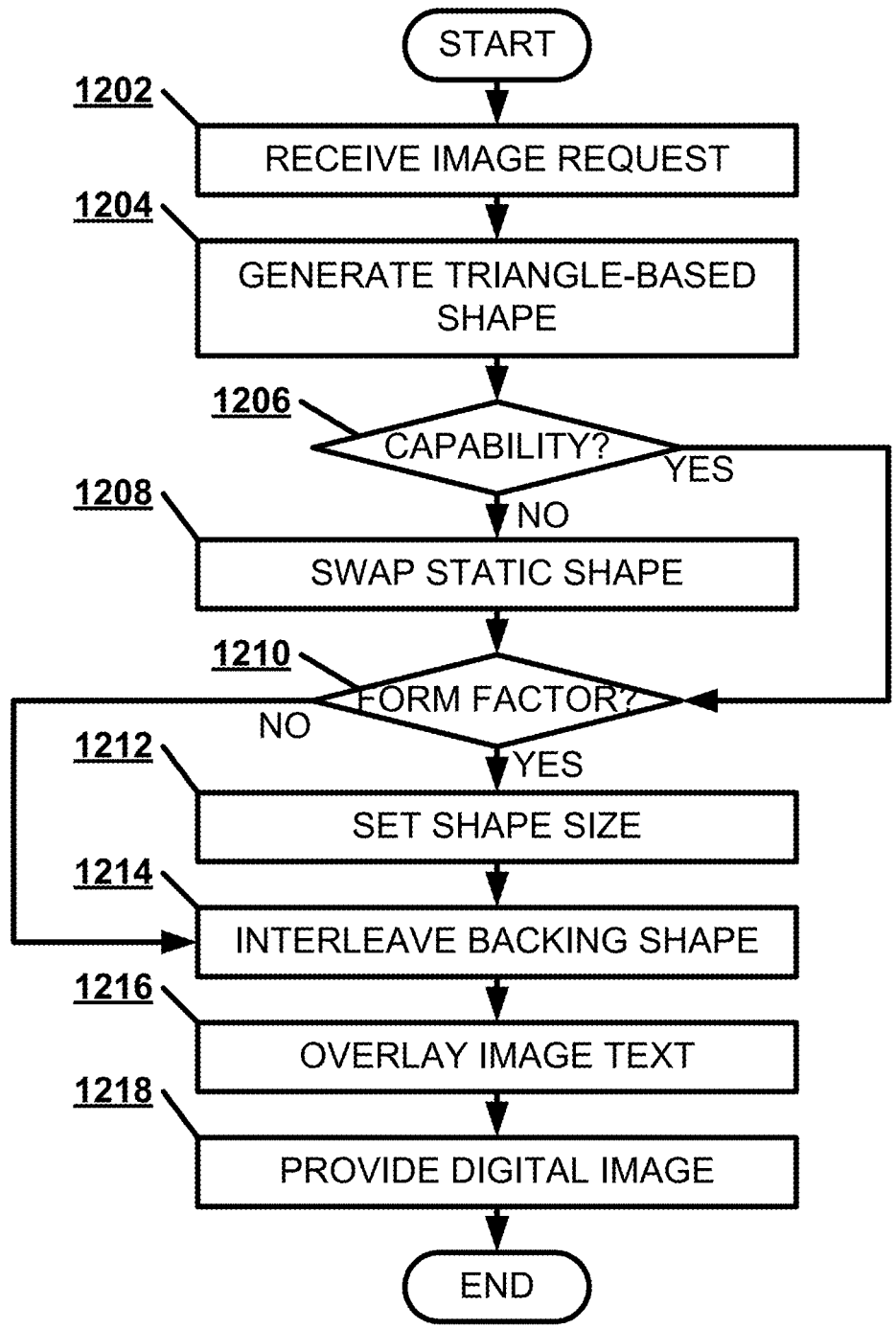

FIG. 12 illustrates, in a flowchart, one embodiment of a method of providing an adjustable digital image with an image text segment and an adjustable text backing shape to a digital image viewer.

Figure 13:
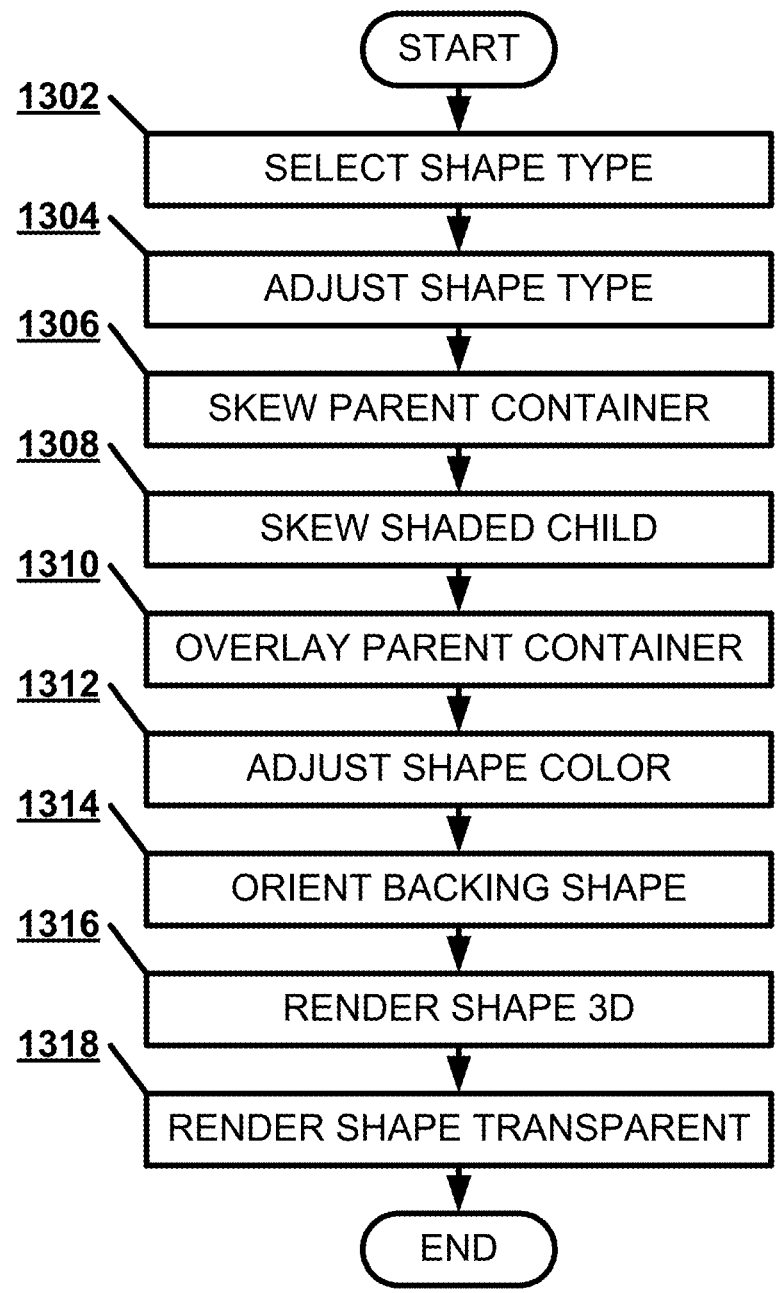

FIG. 13 illustrates, in a flowchart, one embodiment of a method of generating an adjustable text backing shape.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a digital image viewer.

Normally, an image server may provide a download package having multiple versions of a single digital image at multiple resolutions and sizes to a display application, so that the appropriate digital image may be used based on the viewport size. Selecting the proper digital image may be further complicated by any image text segments overlaid on the digital image. Any changes to the image text segment may result in even more versions of the digital image being included in the download package. The complexity of the download package may be reduced by coding the download package so that the display application may execute an automatic size adjustment, such as an automatic cropping action, on the digital image.

Further, the download package may be coded so that the image text segment may be reduced or repositioned independently of the digital image but in response to any automatic size adjustment. The clarity of the image text segment may be increased by interleaving a text backing shape between the image text segment and the digital image. The text backing shape may be coded using cascading style sheets, version 3 (CSS3) to have an adjustable size and shape type.

By executing an automatic size adjustment keyed to viewport height, such as an automatic cropping action, a display application may dynamically optimize the digital image at every image break point. In keying an automatic size adjustment to viewport height, the viewport height is given greater weight than a viewport width in determining the extent of the automatic size adjustment. An image break point refers to a preset digital image size. The display application may display the appropriate digital image without losing aspect ratio, stretching, or lowering image resolution. The display application may also resize and optimize the image as the layered text on top of the image changes or wraps.

The display application may calculate the optimal combination of cropping and aspect ratio with respect to the viewport and image text segment while maintaining a minimum height to preserve text legibility. The display application may crop and adjust the digital image to display properly across multiple form factors. The display application may combine image resizing, cropping and scaling based on the images ratio, and maintaining the correct height for all languages no matter the amount of text wrapping and expansion.

The digital image size may change with respect to the screen width. The minimum height of the digital image may scale linearly with the viewport width, with the aspect ratio kept constant. If the image text segment is longer due to text expansion in localization or due to wrapping in smaller viewports, the display application may crop the digital image to keep the image height to fit the text and the width to fit the viewport. The display application may use hypertext markup language and cascading style sheet background image with a combination of Javascript® and cascading style sheet background-size, background-position, background-repeat, and margin.

The display application may place the digital image on the container of a foreground content to allow the content to overlay on top of the digital image. The display application may use a minimum height equation to apply a minimum height inline style to the content foreground to guarantee a minimum height of the container. When the foreground content expands past the container due to text wrapping, localization, or font changes, the container may grow automatically to accommodate the content. The new height of the container may control the height of the background image The display application may allow the background image to grow to cover the container height while maintaining the aspect ratio. The display application may achieve the cropping effect by centering the image on the container and allow the side of the image to spill outside of the page boundary. When the foreground container expands beyond the minimum height, the background image may expand larger on both width and height while maintaining the aspect ratio. This operation may provide an effect of more cropping since the image is larger while the page width stays constant.

The display application may also shrink or expand an image text segment and a text backing shape for the image text segment to fit the digital image. The display application may create an adjustable text backing shape by overlaying an adjustable parent container over a shaded child to create a triangle based shape. The display application may use this construction to resize the adjustable text backing shape based on available horizontal space.

Thus, in one embodiment, a digital image viewer may crop a digital image to fit into the viewport of the display application. The digital image viewer may determine a viewport height of a viewport for a display application on a digital image viewer that downloads a digital image. The digital image viewer may execute an automatic size adjustment of the digital image keyed to the viewport height.

Further, the digital image viewer may use an adjustable text backing shape to preserve legibility of an image text segment during size conversions of a digital image. The digital image viewer may determine a viewport size of a viewport for a display application that downloads a digital image with an image text segment. The digital image viewer may interleave an adjustable text backing shape of an independently adjustable shape size based on the viewport size between the digital image and the image text segment.

Figure 1:
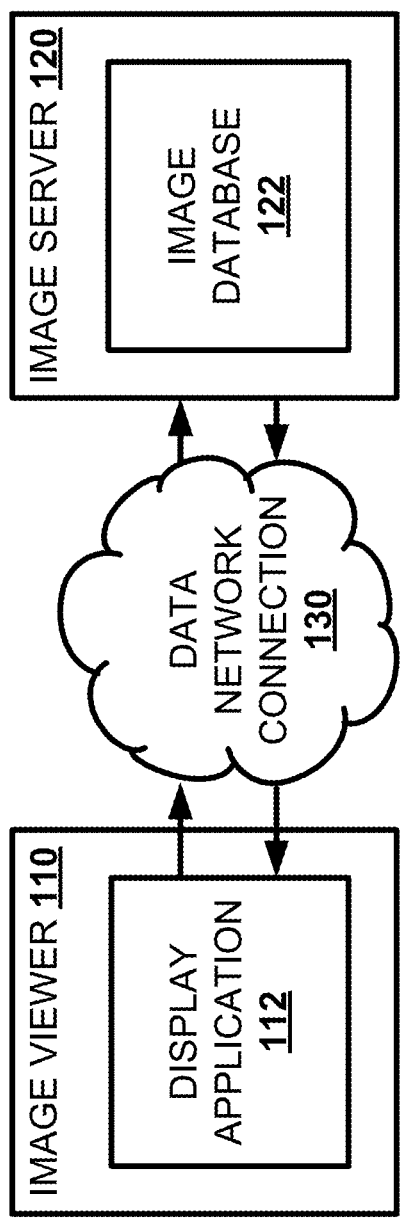
FIG. 1 illustrates, in a block diagram, one embodiment of a data network.

FIG. 1 illustrates, in a block diagram, one embodiment of a data network 100. A digital image viewer 110 may operate a display application 112 that connects to an image server 120 via a data network connection 130. A digital image viewer 110 may be a desktop computer, a laptop computer, a tablet computer, a handheld "smart phone", a smart television, or a computerized wristwatch. The data network connection 130 may be an internet connection, a wide area network connection, a local area network connection, or other type of data network connections. The display application 112 is a software application that displays a digital image to a user, such as a browser, a document viewer, a photo viewer, or other presentation applications. The display application 112 may send an image download request to an image database 122 stored by the image server 120. The image server 120 may then send a download package having a digital image. The download package may adjust the size and shape of the digital image to fit the viewport of the display application 112.

Figure 2:
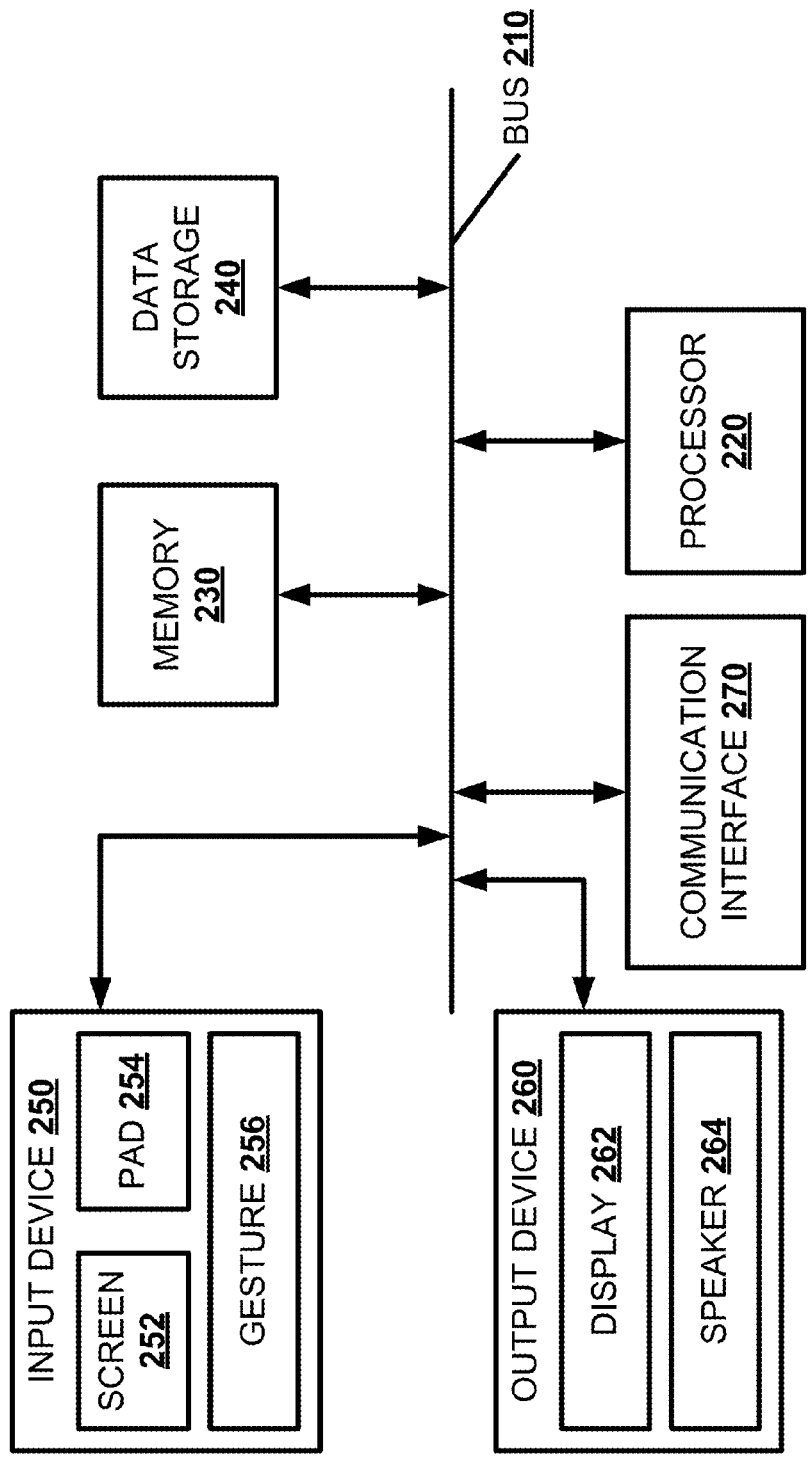
FIG. 2 illustrates, in a block diagram, one embodiment of a computing device.

FIG. 2 illustrates a block diagram of an exemplary computing device 200 which may act as a digital image viewer 110 or an image server 120. The computing device 200 may combine one or more of hardware, software, firmware, and system-on-a-chip technology to implement a digital image viewer 110 or an image server 120. The computing device 200 may include a bus 210, a processor 220, a memory 230, a data storage 240, an input device 250, output device 260, and a communication interface 270. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing digital images.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The output device 260 may include one or more conventional mechanisms that output information to the user, including a display 262, a printer, one or more speakers 264, a headset, or a medium, such as a memory, or a magnetic or optical disk and a corresponding disk drive. The communication interface 270 may include any transceiverlike mechanism that enables computing device 200 to communicate with other devices or networks. The communication interface 270 may include a network interface or a transceiver interface. The communication interface 270 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 270.

Figure 3:
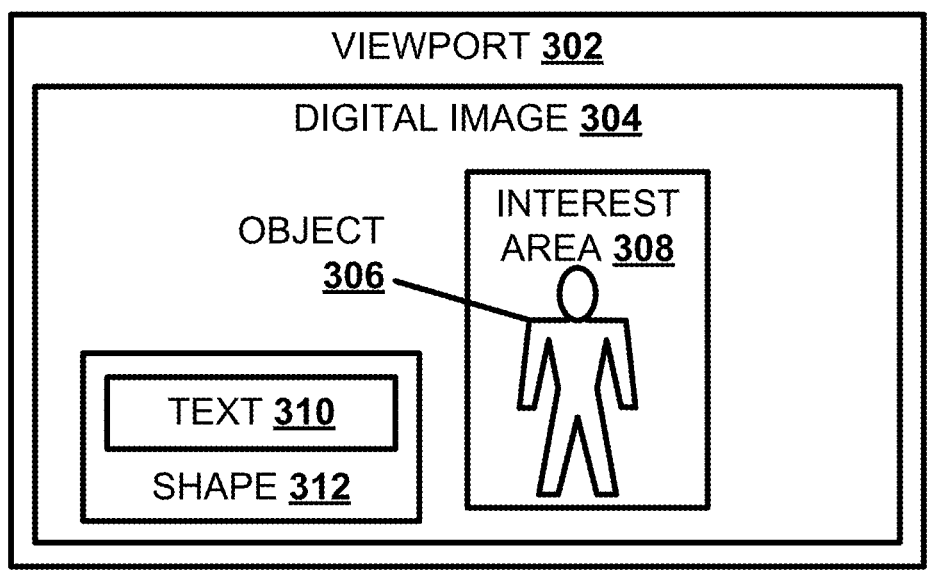
FIG. 3 illustrates, in a block diagram, one embodiment of an adjustable digital image presentation.

FIG. 3 illustrates, in a block diagram, one embodiment of an adjustable digital image presentation 300. A viewport 302 for a display application 112 may display a complete or partial digital image 304. The digital image 304 may feature a focus object 306 that may act as an interest area 308. A focus object 306 is an object that is the focus of a digital image 304, such as a face or person. An interest area 308 is a section of the digital image 304 of interest to the viewer. The digital image 304 may have an image text segment 310. An image text segment 310 is a set of text data that may describe the digital image 304 or may act in concert with the digital image 304 to convey information or influence the viewer. The digital image 304 and image text segment 310 may act together as an advertisement or info graphic. The image text segment 310 may have a text backing shape 312 between the image text segment 310 and the digital image 304 to improve the readability of the image text segment 310. Alternately, the display application 112 may recolor the image text segment 310 when moved within the digital image 304 to preserve readability.

The display application 112 may perform an automatic cropping action as an automatic size adjustment to fit the digital image 304 in the viewport. FIG. 4a illustrates, in a block diagram, one embodiment of a center-cropped digital image 400. The download package may allow the display application 112 to center an automatic cropping action 402 on the digital image 304. The centered automatic cropping action 402 may remove an equal section from the edge of each side of the digital image 304. The image text segment 310, along with the text backing shape 312, may be moved to fit within the cropped digital image 400. The image text segment 310 and the text backing shape 312 may be shrunk to fit in the cropped digital image 400. If the centered automatic cropping action 402 causes the digital image 304 to reach an illegible image break point, the display application 112 may move the image text segment 310 from the digital image 304 to an adjacent text banner 404. An illegible image break point is a digital image size too small to encompass the image text segment 310 without obscuring the digital image 304 or the image text segment 310.

FIG. 4b illustrates, in a block diagram, one embodiment of an off-center cropped digital image 450. The download package may allow the display application 112 to apply a weighted automatic cropping action 452 on the digital image 304. The display application 112 may determine an interest area 308 of the digital image 304 by using a facial recognition software or other object identifying techniques. Alternately the digital image author may encode the location of the interest area 308 in the digital image 304. The display application 112 may apply the weighted automatic cropping action 452 more to one side of the digital image 304 than the other to keep the interest area 308 in the off-center cropped digital image presentation 450.

The text backing shape 312 may be adjustable to accommodate changes to the digital image 304 and the image text segment 310. The text backing shape 312 may be constructed using Cascading Style Sheets, version 3 (CSS3), to allow the shape size to be adjustable independent from the size of the digital image 304 and the image text segment 310. FIG. 5 illustrates, in a block diagram, one embodiment of a backing shape construction 500. An adjustable text backing shape 312 may combine rectangles altered using CSS3 transforms to create one or more triangles. A parent container 502 is a clear rectangle. The display application 112 or the image server 120 may skew the parent container 502 by a parent skew angle, such as down by ten degrees. The display application 112 or the image server 120 may create a shaded child 504 of the parent container 502. A shaded child 504 is a copy of the skewed parent container 502 filled in with a color. The display application 112 or the image server 120 may skew the shaded child 504 by twice the parent skew angle in the opposite direction, such as up by twenty degrees. The display application 112 or the image server 120 may overlay 506 the parent container 502 on the shaded child 504 to create the adjustable text backing shape 312, in this instance a trapezoid.

The display application 112 or the image server 120 may determine the configuration of the adjustable text backing shape 312 based on a number of factors, such as the image text segment configuration, the text direction, the placement of the image text segment 310 within the digital image 304, and other factors. FIG. 6a illustrates, in a block diagram, one embodiment of a first backing shape configuration 600. A first image text segment 310 may have one or more text lines 602. A text line 602 is a piece of text that composes the larger image text segment 310. The first image text segment 310 may have a first short text line 602, a second long text line 602, and a third short text line 602. Based upon this image text segment configuration, the display application 112 or the image server 120 may select an adjustable text backing trapezoid 604 for that image text segment 310.

Additionally, the image text segment 310 may be translated depending on the user or the location of the digital image viewer 110. Different languages may have different text directions 606. For example, English may be read left to right, while Hebrew may be read right to left. The display application 112 may orient the adjustable text backing trapezoid 604 based on the text direction 606. For example, for an English image text segment 310, the adjustable text backing trapezoid 604 may have the narrower end to the right.

FIG. 6b illustrates, in a block diagram, one embodiment of a second backing shape configuration 650. A second image text segment 310 may have a first short text line 602, a second long text line 602, and a third long text line 602. Based upon this image text segment configuration, the display application 112 or the image server 120 may select an adjustable text backing pentagon 652 for that image text segment 310. In one example, a Hebrew image text segment 310 may have the adjustable text backing pentagon 652 with the narrower end to the left.

FIG. 7 illustrates, in a flowchart, one embodiment of a method 700 of displaying an adjustable digital image 304 in a digital image viewer 110. A display application 112 on a digital image viewer 110 may send an image download request to an image server 120 (Block 702). The display application 112 may receive a download package having a digital image 304 with an image text segment 310 from the image server 120 (Block 704). The display application 112 may determine a viewport size, such as a viewport height, of a viewport 302 for the display application 112 on the digital image viewer 110 that downloads the digital image 304 (Block 706). The display application 112 may execute an automatic size adjustment of the digital image 304 keyed to the viewport height, so that viewport height is given more weight than the viewport width (Block 708). The display application 112 may factor a text height of an image text segment 310, as well as any image text translation of the image text segment 310, into the automatic size adjustment (Block 710). The display application 112 may place the image text segment 310 on to the size adjusted digital image 304 (Block 712). If the display application 112 detects a viewport size adjustment (Block 714), the display application 112 may resize the digital image 304 based on the viewport size adjustment (Block 716). A viewport size adjustment is a change in the size of the display application frame.

FIG. 8 illustrates, in a flowchart, one embodiment of a method 800 of providing an adjustable digital image to a digital image viewer. An image server 120 may receive an image download request from a display application 112 on a digital image viewer 110 (Block 802). If the image server 120 receives a form factor indication from the digital image viewer 110 describing the display size of the digital image viewer 110 (Block 804), the image server 120 may execute an automatic size adjustment, such as an automatic cropping action, on the digital image 304 (Block 806). The image server 120 may overlay the image text segment 310 on the digital image 304 that repositions based on the automatic cropping action (Block 808). The image server 120 may provide a download package having a digital image 304 with an image text segment that executes an automatic size adjustment, such as an automatic cropping action, to fit the digital image 304 to a viewport size of a viewport 302 for the display application 112 factoring in a text height of the image text segment 310 and keyed to a viewport height of the viewport 302 (Block 810).

FIG. 9 illustrates, in a flowchart, one embodiment of a method 900 of automatic size adjustment. A display application 112 on a digital image viewer 110 or an image server 120 may execute the automatic size adjustment by executing an automatic cropping action. The display application 112 or the image server 120 may determine a viewport size of a viewport 302 for the display application 112 (Block 902). If the cropping action is not weighted (Block 904), the display application 112 or the image server 120 may center an automatic cropping action on the digital image 304 (Block 906). The display application 112 or the image server 120 may factor an interest area 308 of the digital image 304 into an automatic cropping action (Block 908). The display application 112 or the image server 120 may execute an automatic cropping action on the digital image 304 based on a viewport size of the viewport 302 (Block 910).

FIG. 10 illustrates, in a flowchart, one embodiment of a method 1000 of placing an image text segment 310 on a digital image 304. The display application 112 or the image server 120 may overlay an image text segment 310 on the digital image 304 (Block 1002). The display application 112 or the image server 120 may execute an automatic size adjustment of the digital image keyed to a viewport height of the viewport 302 of the display application 112 (Block 1004). If the automatic size adjustment reaches an illegible image break point (Block 1006), the display application 112 or the image server 120 may move the image text segment 310 from the digital image 304 to an adjacent text banner 404 at an illegible image break point (Block 1008). The display application 112 or the image server 120 may reposition the image text segment 310 on the digital image 304 based on the automatic size adjustment (Block 1010). The display application 112 or the image server 120 may recolor an image text segment 310 on the digital image 304 upon repositioning to heighten a background contrast (Block 1012). The display application 112 or the image server 120 may shrink an image text segment 310 on the digital image 304 based on the automatic size adjustment (Block 1014).

FIG. 11 illustrates, in a flowchart, one embodiment of a method 1100 of displaying an adjustable digital image 304 with an image text segment 310 and an adjustable text backing shape 312 on a digital image viewer 110. A display application 112 on a digital image viewer 110 may send an image download request to an image server 120 (Block 1102). The display application 112 may receive a download package having a digital image 304 with an image text segment 310 from the image server 120 (Block 1104). The display application 112 may determine a viewport size of a viewport 302 for the display application 112 on the digital image viewer 110 that downloads the digital image 304 with the image text segment 310 (Block 1106). If the viewport 302 is at an illegible image break point (Block 1108), the display application 112 may move the image text segment 310 from the adjustable text backing shape 312 to an adjacent text banner 404 at an illegible image break point (Block 1110). The display application 112 may set an independently adjustable shape size of the adjustable text backing shape 312 (Block 1112). The display application 112 may generate a triangle-based shape for the adjustable text backing shape 312 (Block 1114). The display application 112 may position the adjustable text backing shape 312 on an intra-image coordinate based on a shape type for the adjustable text backing shape 312 (Block 1116). The display application 112 may interleave an adjustable text backing shape 312 of an independently adjustable shape size based on the viewport size between the digital image 304 and the image text segment 310 (Block 1118). If the display application 112 detects a viewport size adjustment (Block 1120), the display application 112 may resize the digital image 304, the image text segment 310, and the adjustable text backing shape 312 based on the viewport size adjustment (Block 1122). The display application may maintain a shape configuration for the adjustable text backing shape 312 while altering the independently adjustable shape size (Block 1124).

FIG. 12 illustrates, in a flowchart, one embodiment of a method 1200 of providing an adjustable digital image 304 with an image text segment 310 and an adjustable text backing shape 312 to a digital image viewer 110. An image server 120 may receive an image download request from a display application 112 on a digital image viewer 110 (Block 1202). The image server 120 may generate a triangle-based shape for the adjustable text backing shape 312 (Block 1204). If the display application 112 does not have the capability to adjust the text backing shape as coded (Block 1206), the image server 120 may swap a static text backing shape for the adjustable text backing shape based on application capability (Block 1208). If the image server 120 receives a form factor indication from the digital image viewer 110 describing the display size of the digital image viewer 110 (Block 1210), the image server 120 may set the independently adjustable shape size (Block 1212). The image server 120 may interleave an adjustable text backing shape 312 of an independently adjustable shape size based on the viewport size between the digital image 304 and the image text segment 310 (Block 1214). The image server 120 may overlay the image text segment 310 on the digital image 304 that repositions based on changes to the viewport size (Block 1216). The image server 120 may provide a digital image 304 overlaid with an image text segment 310 having an adjustable text backing shape 312 of an independently adjustable shape size based on the viewport size (Block 1218).

FIG. 13 illustrates, in a flowchart, one embodiment of a method 1300 of generating an adjustable text backing shape 312. The display application 112 or the image server 120 may select a shape type for the adjustable text backing shape 312 based on the image text segment configuration (Block 1302). The display application 112 or the image server 120 may adjust a shape type for the adjustable text backing shape 312 based on an intra-image coordinate for the adjustable text backing shape 312 (Block 1304). The display application 112 or the image server 120 may skew a parent container 502 down by a parent skew angle (Block 1306). The display application 112 or the image server 120 may skew a shaded child 504 up by double the parent skew angle (Block 1308). The display application 112 or the image server 120 may overlay 506 the parent container 502 on the shade child 504 to create the adjustable backing shape 312 (Block 1310). The display application 112 or the image server 120 may adjust a shape color for the adjustable text backing shape 312 based on the text color of the image text segment 310 or the color of the digital image 304 at the intra-image coordinate for the adjustable text backing shape 312 (Block 1312). The display application 112 or the image server 120 may orient the adjustable text backing shape 312 based on a text direction 606 of the image text segment 310 (Block 1314). The display application 112 or the image server 120 may render a simulated three dimensional shape for the adjustable text backing shape 312 (Block 1316). The display application 112 or the image server 120 may render the adjustable text backing shape 312 as transparent (Block 1318).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   determining a viewport size of a viewport for a display application on a digital image viewer that downloads a digital image with an image text segment; and
   interleaving an adjustable text backing shape of an independently adjustable shape size based on the viewport size between the digital image and the image text segment.

2. The method of claim 1, further comprising:
   rendering a simulated three dimensional shape for the adjustable text backing shape.

3. The method of claim 1, further comprising:
   rendering the adjustable text backing shape as transparent.

4. The method of claim 1, further comprising:
   generating a triangle-based shape for the adjustable text backing shape.

5. The method of claim 1, further comprising:
   skewing a parent container down by a parent skew angle;
   skewing a shaded child up by double the parent skew angle; and
   overlaying the parent container on the shaded child to create the adjustable text backing shape.

6. The method of claim 1, further comprising:
   maintaining a shape configuration for the adjustable text backing shape while altering the independently adjustable shape size.

7. The method of claim 1, further comprising:
   adjusting a shape color for the adjustable text backing shape based on the text color of the image text segment.

8. The method of claim 1, further comprising:
   selecting a shape type for the adjustable text backing shape based on the image text segment configuration.

9. The method of claim 1, further comprising:
   adjusting a shape type for the adjustable text backing shape based on an intra-image coordinate for the adjustable text backing shape.

10. The method of claim 1, further comprising:
    positioning the adjustable text backing shape on an intra-image coordinate based on a shape type for the adjustable text backing shape.

11. The method of claim 1, further comprising:
orienting the adjustable text backing shape based on a text direction of the image text segment.

12. The method of claim 1, further comprising:
moving an image text segment from the adjustable text backing shape to an adjacent text banner at an illegible image break point.

13. The method of claim 1, further comprising:
detecting a viewport size adjustment; and
resizing the independently adjustable shape size based on the viewport size adjustment.

14. The method of claim 1, further comprising:
setting the independently adjustable shape size at the digital image viewer.

15. A tangible machine-readable medium having a set of instructions detailing a method stored thereon that when executed by one or more processors cause the one or more processors to perform the method, the method comprising:
receiving at an image server an image download request from a display application on a digital image viewer; and
providing a digital image overlaid with an image text segment having an adjustable text backing shape of an independently adjustable shape size based on the viewport size.

16. The tangible machine-readable medium of claim 15, wherein the method further comprises:
swapping a static text backing shape for the adjustable text backing shape based on application capability.

17. The tangible machine-readable medium of claim 15, wherein the method further comprises:
skewing a parent container down by a parent skew angle;
skewing a shaded child up by double the parent skew angle; and
overlaying the parent container on the shaded child to create the adjustable text backing shape.

18. The tangible machine-readable medium of claim 15, wherein the method further comprises:
receiving in an image server a form factor indication from the digital image viewer; and
setting the independently adjustable shape size at the image server.

19. A digital image viewer, comprising:
a communication interface that downloads a digital image with an image text segment from an image server;
a processor that determines a viewport size of a viewport for a display application and interleaves between the digital image and the image text segment an adjustable text backing shape of an independently adjustable shape size based on the viewport size; and
a display that presents the digital image with the image text segment on the adjustable text backing shape.

20. The digital image viewer of claim 19, wherein the adjustable text backing shape is a triangle-based shape.

* * * * *